(12) United States Patent
Kang et al.

(10) Patent No.: US 11,995,891 B2
(45) Date of Patent: May 28, 2024

(54) COMPUTER PROGRAM AND METHOD FOR TRAINING ARTIFICIAL NEURAL NETWORK MODEL BASED ON TIME-SERIES BIOSIGNAL

(71) Applicant: IMEDISYNC, INC., Seoul (KR)

(72) Inventors: Seung Wan Kang, Seoul (KR); Ukeob Park, Seoul (KR)

(73) Assignee: IMEDISYNC, INC., Seoul (KR)

( * ) Notice: Subject to any disclaimer, the term of this patent is extended or adjusted under 35 U.S.C. 154(b) by 673 days.

(21) Appl. No.: 17/146,220

(22) Filed: Jan. 11, 2021

(65) Prior Publication Data

US 2022/0019808 A1 Jan. 20, 2022

Related U.S. Application Data

(63) Continuation of application No. PCT/KR2020/017907, filed on Dec. 9, 2020.

(30) Foreign Application Priority Data

Jul. 20, 2020 (KR) ........................ 10-2020-0089869

(51) Int. Cl.
*G06V 20/40* (2022.01)
*G06F 3/01* (2006.01)
*G06T 7/00* (2017.01)

(52) U.S. Cl.
CPC .............. *G06V 20/47* (2022.01); *G06F 3/015* (2013.01); *G06T 7/0012* (2013.01); *G06F 2218/16* (2023.01); *G06T 2207/10016* (2013.01); *G06T 2207/20084* (2013.01)

(58) Field of Classification Search
CPC ........ G06V 20/47; G06V 10/82; G06V 40/15; G06F 3/015; G06F 2218/16; G06F 2203/011; G06T 7/0012; G06T 2207/10016; G06T 2207/20084
See application file for complete search history.

(56) References Cited

U.S. PATENT DOCUMENTS

| 8,573,980 B2 * | 11/2013 | Wetmore | ................ | G09B 19/00 |
| | | | | 434/238 |
| 10,203,751 B2 * | 2/2019 | Keskin | ..................... | G06F 3/165 |
| 11,747,902 B2 * | 9/2023 | Azemi | ..................... | G06F 3/015 |
| | | | | 345/156 |

(Continued)

FOREIGN PATENT DOCUMENTS

| KR | 10-2011-0023872 A | 3/2011 |
| KR | 10-2019-0035368 A | 4/2019 |

(Continued)

*Primary Examiner* — Mia M Thomas
(74) *Attorney, Agent, or Firm* — Studebaker & Brackett PC

(57) ABSTRACT

Disclosed is a computer program stored in a computer-readable storage medium for achieving the above-described objects. When the computer program is executed by one or more processors, the computer program causes the one or more processors to perform the following operations of generating video data for diagnosing a health condition and a pathological symptom on the basis of a biosignal. The operations include receiving a biosignal of a user, preprocessing the biosignal to generate a plurality of pieces of video sub-data, and selecting at least two of the plurality of pieces of video sub-data to generate one or more pieces of video data.

10 Claims, 6 Drawing Sheets

(56) References Cited

U.S. PATENT DOCUMENTS

| | | | | |
|---|---|---|---|---|
| 11,848,079 B2* | 12/2023 | Glasner | ............... | G16H 10/20 |
| 2014/0223462 A1* | 8/2014 | Aimone | ............ | H04N 21/4788 |
| | | | | 725/10 |
| 2016/0000348 A1* | 1/2016 | Kitajo | ...................... | A61B 5/38 |
| | | | | 600/545 |
| 2020/0008684 A1* | 1/2020 | Feinberg | ................ | H04N 5/272 |
| 2020/0075039 A1* | 3/2020 | Eleftheriou | ............. | G10L 25/63 |
| 2021/0124422 A1* | 4/2021 | Forsland | ................ | G06F 3/016 |
| 2021/0286429 A1* | 9/2021 | Azemi | ..................... | G06N 3/04 |
| 2022/0388176 A1* | 12/2022 | Yoshiike | ................... | G06T 7/20 |
| 2023/0267385 A1* | 8/2023 | Shang | ................... | G06Q 10/04 |
| | | | | 706/12 |
| 2023/0267734 A1* | 8/2023 | Shepherd | ............ | G06V 10/764 |
| | | | | 382/100 |
| 2023/0359421 A1* | 11/2023 | Nienstedt | ............. | G06T 7/0002 |

FOREIGN PATENT DOCUMENTS

| | | | |
|---|---|---|---|
| KR | 10-1987225 B1 | 6/2019 | |
| KR | 10-2019-0114694 A | 10/2019 | |
| WO | WO-2017106934 A1 * | 6/2017 | ............ G06F 19/00 |

* cited by examiner

[FIG. 1]
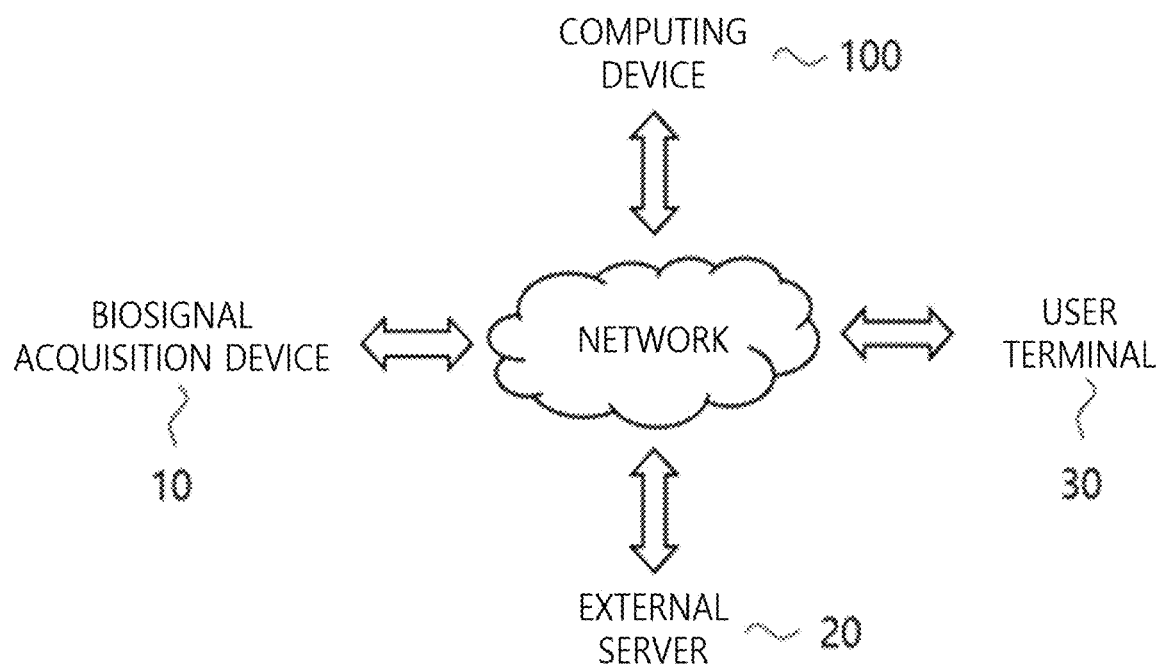

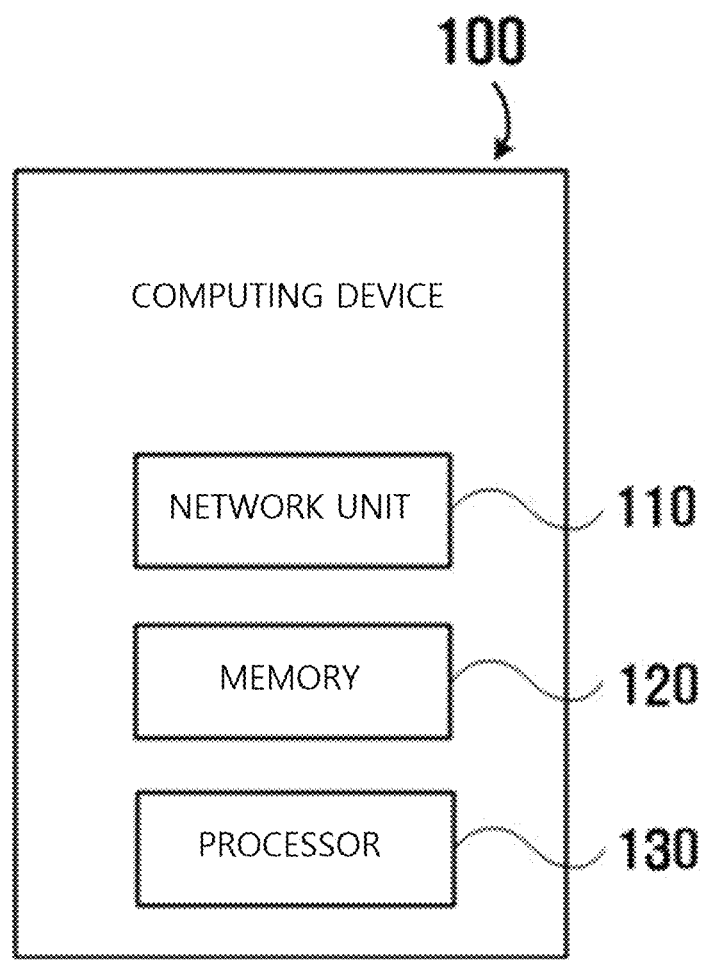
[FIG. 2]

[FIG. 3]
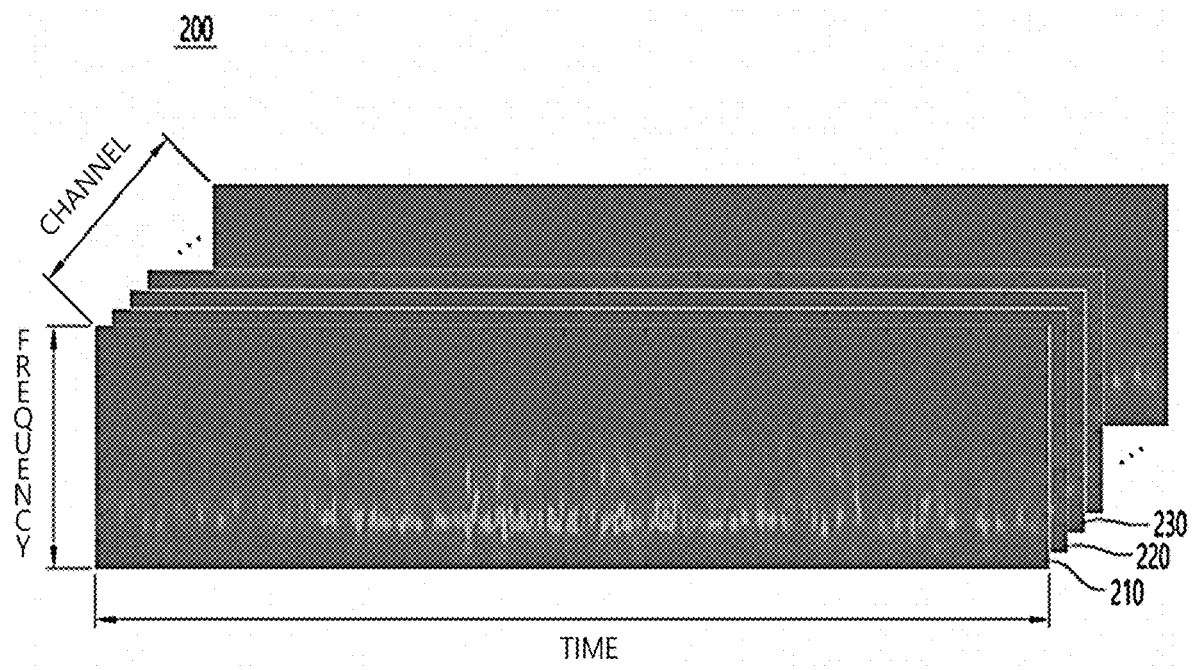

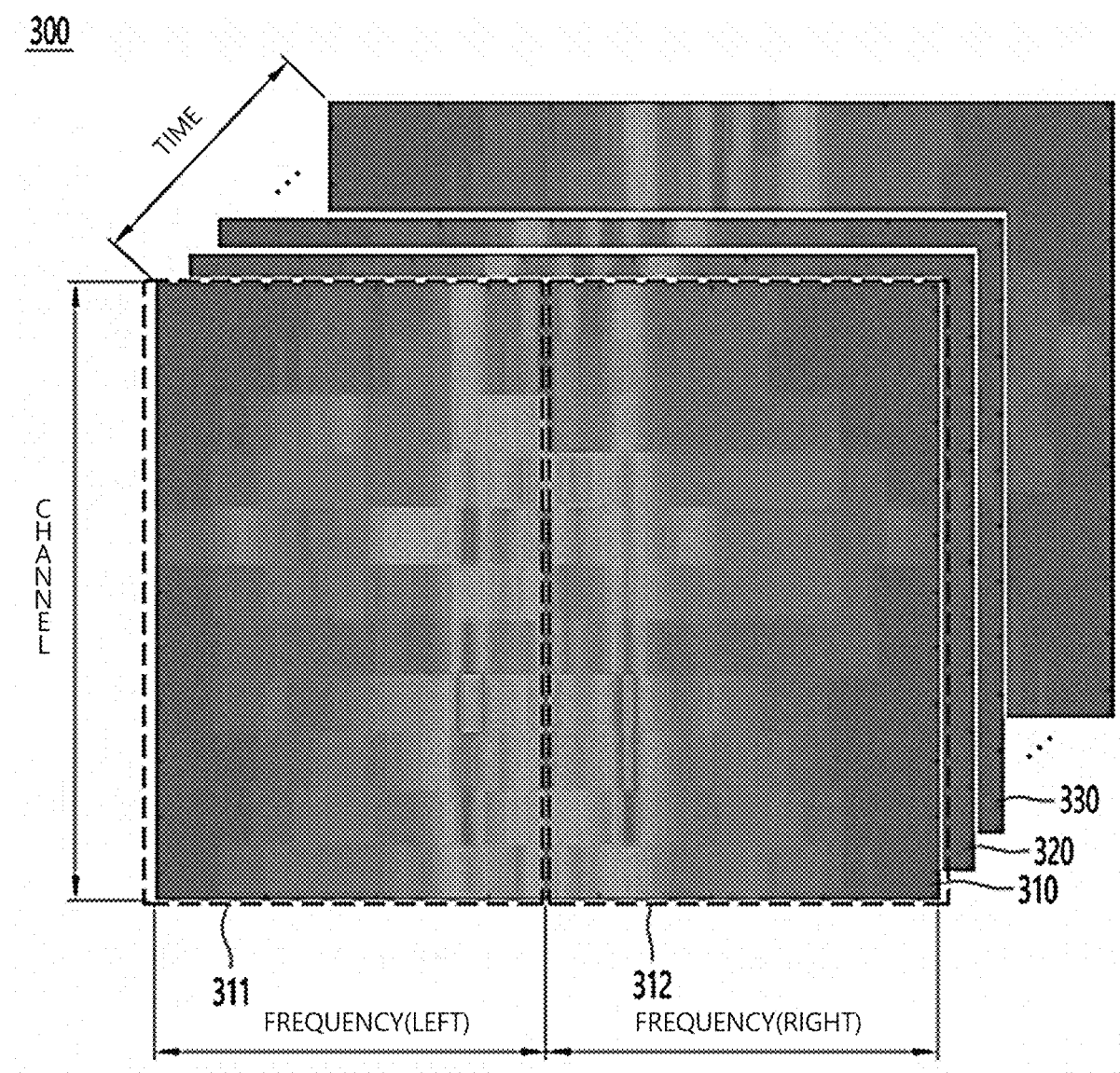
[FIG. 4]

[FIG. 5]
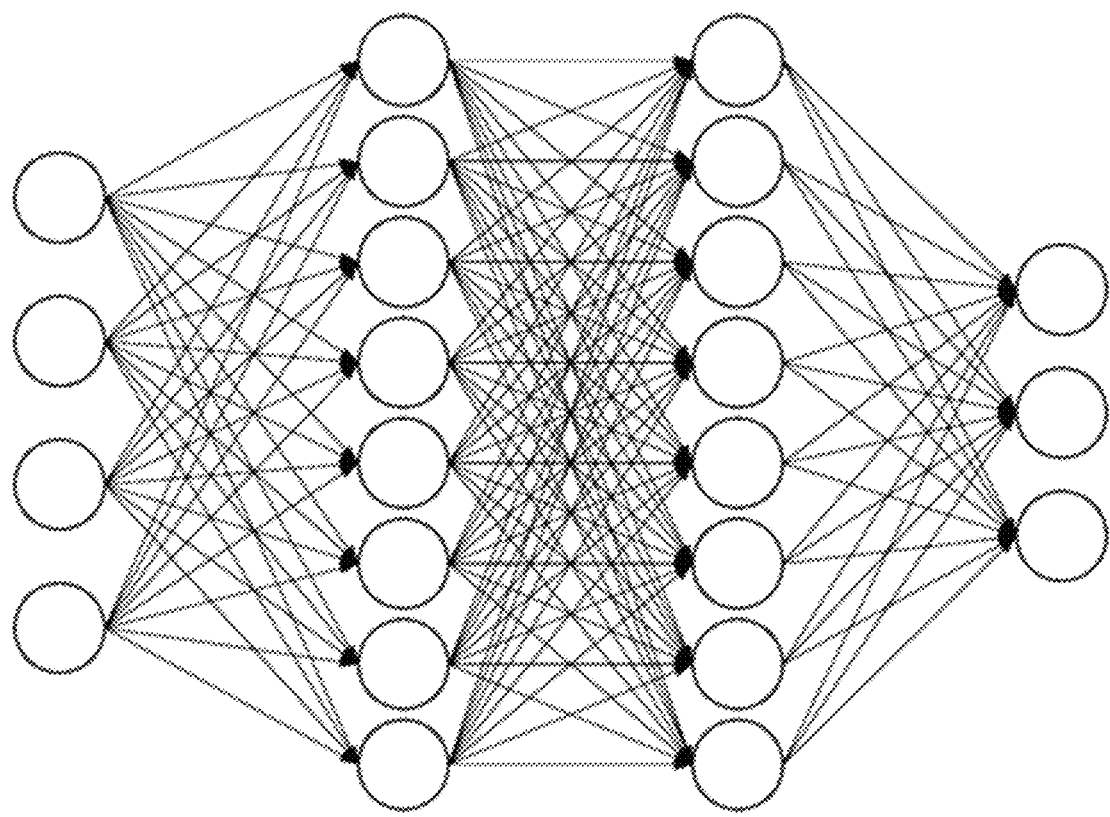

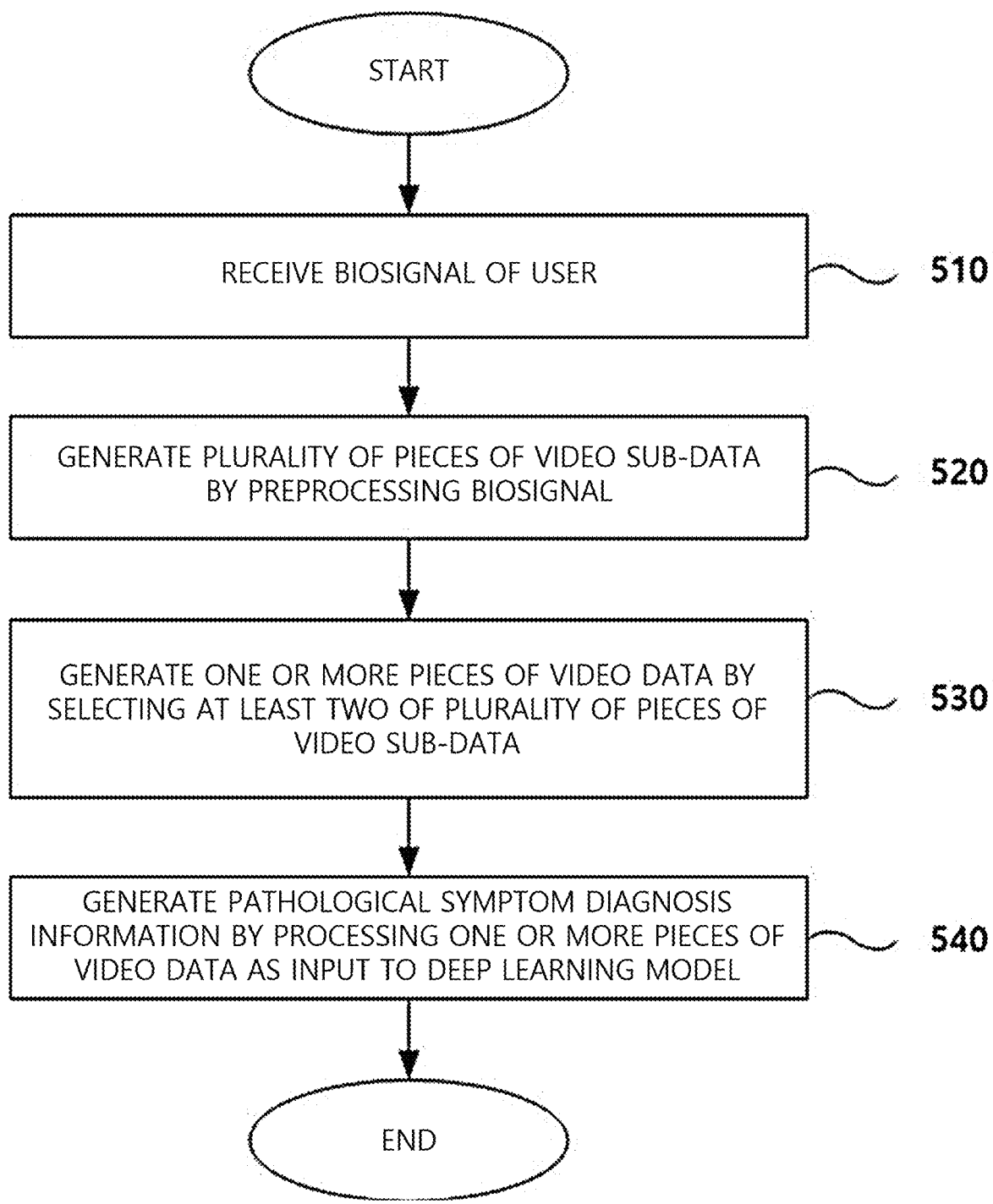

COMPUTER PROGRAM AND METHOD FOR TRAINING ARTIFICIAL NEURAL NETWORK MODEL BASED ON TIME-SERIES BIOSIGNAL

CROSS-REFERENCE TO RELATED APPLICATIONS

The present application is a continuation of International Patent Application No. PCT/KR2020/017907, filed on Dec. 9, 2020, which is based upon and claims the benefit of priority to Korean Patent Application No. 10-2020-0089869, filed on Jul. 20, 2020. The disclosures of the above-listed applications are hereby incorporated by reference herein in their entirety.

TECHNICAL FIELD

The present disclosure provides information on a pathological symptom on the basis of a time-series biosignal acquired from a user, and more particularly, is intended to provide diagnostic information related to a pathological symptom to a user using an artificial neural network.

BACKGROUND ART

With the advent of an aging society in recent years, psychopathological symptoms of elderly people are drawing attention. Psychopathological symptoms include dementia, depression, and the like. In the case of dementia, a magnetic resonance imaging (MRI) scan or a Montreal cognitive assessment (MoCA) test (a subject answers test-type questions, and the likelihood of dementia is estimated with the score) is required to determine whether there is a symptom. However, the scan is relatively expensive and takes more than one hour, and thus it is difficult to do the scan as a precautionary measure. There are drugs used to slow the progression of dementia, but the drugs are expensive. Also, to obtain the prescription, an amyloid positron emission tomography (PET) test for checking whether a corresponding drug is effective for a patient is essential. Since the test is also expensive, it is not easy for users to prevent dementia. Depression can be diagnosed through a doctor's medical examination by interview and a questionnaire such as hospital anxiety and depression scale (HADS) and beck depression inventory (BDI). However, the methods are not efficient in terms of cost and time.

In other words, since there is no remedy for such psychopathological symptoms, it is important to detect whether there is a danger in the initial stage and prevent the danger.

Meanwhile, various attempts to predict a disease or an illness on the basis of a user's biosignal are continuously being made to provide efficiency in terms of cost and time. Korean Patent Publication No. 10-2011-0023872 discloses an apparatus for diagnosing dementia on the basis of an electroencephalography (EEG) signal measured from a user.

In this situation, methods for diagnosing depression, dementia, etc. on the basis of a biosignal are being advanced with the development of deep learning (DL) technologies.

Consequently, in the corresponding field, there can be a demand for a computer program for providing pathological symptom diagnosis information on the basis of a time-series biosignal measured from a user's body using an artificial neural network.

DISCLOSURE

Technical Problem

The present disclosure is directed to providing pathological symptom diagnosis information on the basis of a time-series biosignal acquired from a user using artificial intelligence.

Objects to be solved by the present disclosure are not limited to that mentioned above, and other objects that have not been mentioned will be clearly understood by those of ordinary skill in the art from the following description

Technical Solution

One aspect of the present disclosure provides a computer program stored in a computer-readable storage medium. When the computer program is executed by one or more processors, the computer program causes the one or more processors to perform the following operations of generating video data for diagnosing a health condition and a pathological symptom on the basis of biosignals. The operations may include receiving biosignals of a user, preprocessing the biosignals to generate a plurality of pieces of video sub-data, and selecting at least two of the plurality of pieces of video sub-data to generate one or more pieces of video data.

The biosignals may be a signal acquired in time-series from the user's body and include one or more of an electroencephalography signal and an electrocardiogram signal acquired through at least one channel, and the receiving of the biosignals of the user may include acquiring the biosignals through one or more electrodes on the basis of a electric potential difference measured from one or more areas of the user's body.

The biosignals may include signals acquired in time series from the user's body through one or more channels, and the preprocessing of the biosignals may include performing a frequency conversion on each of one or more of the biosignals each acquired from the one or more channels on the basis of a frequency of a predetermined range to generate one or more spectrograms, and generating the plurality of pieces of video sub-data by rearranging the one or more spectrograms. The one or more spectrograms may be image data classified according to the one or more channels, and each of the one or more spectrograms may be an image representing a frequency variation over time.

The generating of the plurality of pieces of video sub-data may include identifying one or more frequencies acquired through each of the channels at the same time point, and rearranging the one or more frequencies identified to be acquired through each of the channels at the same time point on the basis of locations of the one or more channels to generate the plurality of pieces of video sub-data. The plurality of pieces of video sub-data may be image data distinguished by time point and may be images representing frequencies each measured through the one or more channels according to the locations of the one or more channels.

The selecting of the at least two of the plurality of pieces of video sub-data may include identifying the number of the plurality of pieces of video sub-data, setting a first time interval on the basis of the number of the plurality of pieces of video sub-data, selecting at least two of the plurality of pieces of video sub-data at the set first time intervals based on the piece of video sub-data of an initial time point, and connecting the selected at least two pieces of video sub-data on the basis of time points to generate first video data. The video data may be data related to a video of which one frame is obtained as each of the pieces of video sub-data by connecting the two or more pieces of video sub-data.

The selecting of the at least two of the plurality of pieces of video sub-data may include selecting at least two of the plurality of pieces of video sub-data at the set first time intervals based on the piece of video sub-data different from the piece of video sub-data of the initial time point, and connecting the selected at least two pieces of video sub-data on the basis of time points to generate second video data. The second video data may include video sub-data which is at least partially different from the first video data.

The selecting of the at least two of the plurality of pieces of video sub-data may include setting a second time interval different from the first time interval, selecting at least two of the plurality of pieces of video sub-data at the set second time intervals, and connecting the selected at least two pieces of video sub-data on the basis of time points to generate third video data. The third video data may include video sub-data which is at least partially different from the first video data.

The operations may further include processing the one or more pieces of video data as an input to a deep learning model to generate diagnostic information of a health condition and a pathological symptom. The deep learning model may include one or more network functions and may be trained with a training dataset including training input datasets and training output datasets. The training input datasets may include a plurality of pieces of training video data generated on the basis of biosignals measured from each of a plurality of users in time series, and the training output datasets may include a plurality of pieces of learning diagnosis information that each correspond to the plurality of users.

The deep learning model may be generated when the one or more processors input each of the training input datasets to the one or more network functions, calculate errors by comparing each piece of output data computed through the one or more network functions with each of the training output datasets that each correspond to labels of the training input datasets, adjust weights of the one or more network functions in a backpropagation manner on the basis of the errors, determine whether to stop training the one or more network functions using verification data when the training is performed for a predetermined epoch or more, and test performance of the one or more network functions using a test dataset to determine whether to activate the one or more network functions.

Another aspect of the present disclosure provides a method of generating video data for diagnosing a health condition and a pathological symptom on the basis of a biosignal, which is performed by a processor of a computing device. The method may include receiving, by the processor, a biosignal of a user, preprocessing, by the processor, the biosignal to generate a plurality of pieces of video sub-data, and selecting, by the processor, at least two of the plurality of pieces of video sub-data to generate one or more pieces of video data.

Other details of the present disclosure are included in the detailed description and the drawings.

Advantageous Effects

According to various embodiments of the present disclosure, it is possible to provide a computer program for providing pathological symptom information based on a biosignal acquired from a user using an artificial neural network.

Effects of the present disclosure are not limited to those mentioned above, and other effects that have not been mentioned will be clearly understood by those of ordinary skill in the art from the following description.

DESCRIPTION OF DRAWINGS

Various aspects are described with reference to the drawings, wherein like reference numeral are used to refer to like elements throughout. In the following description, for the purpose of explanation, numerous specific details are set forth in order to provide a thorough understanding of one or more aspects. However, it is clear that such aspects can be realized without these specific details.

FIG. 1 is a conceptual diagram illustrating a system in which various modes of a computing device for providing pathological symptom diagnosis information on the basis of a biosignal according to an embodiment of the present disclosure may be implemented.

FIG. 2 is a block diagram of the computing device for providing pathological symptom diagnosis information on the basis of a biosignal according to the embodiment of the present disclosure.

FIG. 3 shows example diagrams of one or more spectrograms according to an embodiment of the present disclosure.

FIG. 4 shows example diagrams of a plurality of pieces of video sub-data according to an embodiment of the present disclosure.

FIG. 5 is a schematic diagram of network functions according to an embodiment of the present disclosure.

FIG. 6 is a flowchart illustrating a method of providing pathological symptom diagnosis information on the basis of a biosignal according to an embodiment of the present disclosure.

BEST MODE OF THE INVENTION

Hereinafter, various embodiments will be described with reference to the drawings. In this specification, a variety of descriptions will be provided to aid in understanding the present disclosure. However, it is apparent that the embodiments can be implemented without the detailed descriptions.

As used herein, the terms "component," "module," "system," etc. refer to hardware, firmware, software, a combination of hardware and software, or execution of software. For example, a component may be, but is not limited to, a procedure running on a processor, a processor, an object, an execution thread, a program, and/or a computer. By way of illustration, both an application running on a computing device and the computing device may be a component. One or more components may reside within a process and/or an execution thread. One component may be localized on one computer. One component may be distributed between two or more computers. In addition, these components may be executed from various computer-readable media having various structures stored therein. These components may communicate by local and/or remote processing according to, for example, signals having one or more packets of data (e.g., data from one component which interacts with other components in a local system or distributed system and/or data received from another system through a signal via a network such as the Internet).

The term "or" is intended to mean a comprehensive "or," not an exclusive "or." In other words, unless otherwise specified or when it is unclear in context, "X uses A or B" intends to mean one of the natural comprehensive substitutions. That is, when X uses A, X uses B, and X uses both A and B, "X uses A or B" may be applied to any one of the cases. Further, the term "and/or" used herein should be understood as designating and including all of the possible combinations of one or more of listed relevant items.

The term "include" and/or "including" should be understood as meaning that a corresponding characteristic and/or an element exists. It should be understood that the term "include" and/or "including" does not exclude the existence or an addition of one or more other characteristics, elements, and/or a group thereof. Further, unless otherwise specified or when it is unclear that a single form is indicated in context, the singular should be construed as generally meaning "one or more" in this specification and the claims.

Those of ordinary skill in the art should recognize that various illustrative logical blocks, configurations, modules, circuits, units, logic, and algorithm operations additionally described in relation to embodiments disclosed herein may be implemented by electronic hardware, computer software, or a combination thereof. In order to clearly illustrate interchangeability of hardware and software, various illustrative components, blocks, configurations, units, logics, modules, circuits, and operations have been generally described above, in the functional aspects thereof. Whether the functionality is implemented as hardware or software depends on a specific application or design restraints given to the general system. Those of ordinary skill in the art may implement functionality described in various ways for each of the specific applications. However, it should not be construed that determinations of the implementation deviate from the scope of the present disclosure.

Descriptions of the presented embodiments are provided so that those of ordinary skill in the art can use or carry out the present disclosure. Various modifications of the embodiments will be apparent to those of ordinary skill in the art. General principles defined herein may be applied to other embodiments without departing from the scope of the present disclosure. Accordingly, the present disclosure is not limited to the embodiments presented herein. The present disclosure should be interpreted within the widest range of meaning consistent with the principles and new characteristics presented herein.

In this specification, a "computer" means any type of hardware device including at least one processor and may be understood as encompassing a software configuration operating on a corresponding hardware device in some embodiments. For example, a computer may be understood as including, but not limited to, all of a smart phone, a tablet personal computer (PC), a desktop computer, a notebook computer, and a user client and application running on each device.

Embodiments of the present disclosure will be described in detail below with reference to the accompanying drawings.

Operations described herein may be performed by a computer, but the subject of each operation is not limited thereto. At least some of the operations may be performed by different devices in some embodiments.

FIG. 1 is a conceptual diagram illustrating a system in which various modes of a computing device for providing pathological symptom diagnosis information on the basis of a biosignal according to an embodiment of the present disclosure may be implemented.

A system according to embodiments of the present disclosure may include a computing device 100, a biosignal acquisition device 10, an external server 20, a user terminal 30, and a network. The components shown in FIG. 1 are exemplary. Accordingly, additional components may exist, or some of the components shown in FIG. 1 may be omitted. The computing device 100, the biosignal acquisition device 10, the external server 20, and the user terminal 30 may transmit and receive data to and from each other for the system according to the embodiments of the present disclosure via the network.

The network according to embodiments of the present disclosure may use various wired communication systems such as a public switched telephone network (PSTN), an x digital subscriber line (xDSL), a multi-rate DSL (MDSL), a very high speed DSL (VDSL), a universal asymmetric DSL (UADSL), a high bit rate DSL (HDSL), and a local area network (LAN).

Also, the network presented herein may use various wireless communication systems such as a code division multi-access (CDMA) system, a time division multi-access (TDMA) system, a frequency division multi-access (FDMA) system, an orthogonal frequency division multi-access (OFDMA) system, a single carrier (SC)-FDMA system, and other systems.

The network according to embodiments of the present disclosure may be structured in any communication manner, such as wired communication and wireless communication, and may include various communication networks such as a personal area network (PAN) and a wide area network (WAN). Also, the network may be the well-known World Wide Web (WWW) and may employ a wireless transmission technology used in short-range communication such as infrared data association (IrDA) or Bluetooth. Technologies described herein may be used not only in the above-described networks but also in other networks.

According to an embodiment of the present disclosure, the user terminal 30 may be a terminal related to a user who wants to access the computing device 100 and acquire diagnostic information of his or her own pathological symptom. Since a display is included, the user terminal 30 may receive an input of a user and provide an output in an arbitrary form.

The user terminal 30 may mean an entity (entities) having an arbitrary form in a system having a mechanism for communication with the computing device 100. For example, the user terminal 30 may include a PC, a notebook computer, a mobile terminal, a smart phone, a tablet PC, a wearable device, etc. and may include any type of terminal that can access a wired/wireless network. Also, the user terminal 30 may include an arbitrary server which is implemented by at least one of an agent, an application programming interface (API), and a plug-in. In addition, the user terminal 30 may include an application source and/or a client application.

According to an embodiment of the present disclosure, the biosignal acquisition device 10 may acquire a biosignal of the user. The biosignal may be a signal acquired from the user's body in time series and may be a signal acquired through one or more channels. For example, the biosignal may include at least one of an electroencephalography (EEG) signal and an electrocardiogram (ECG) signal. According to an additional embodiment, the biosignal may further include information on an electrooculogram (EOG), an electromyogram (EMG), and the like. The biosignal acquisition device 10 may include a plurality of electrodes constituting one or more channels and acquire the biosignal on the basis of a electric potential difference measured from one or more areas of the user's body through the plurality of electrodes.

As an example, the biosignal acquisition device 10 may be a brainwave test module for detecting electrical activity in the user's brain from a plurality of surface areas of the brain. In this case, the brainwave test module constituting the biosignal acquisition device 10 may include an electrode for measuring voltages which are generated on the basis of electrical activity of a user's brain and monitor electrical activity of the brain using a difference between voltages measured through the electrode and another electrode neighboring the electrode. In other words, the biosignal acquisition device 10 may acquire an EEG signal related to electrical activity of the user's brain by measuring a voltage variation caused by an ionic current generated through activity of neurons in the user's brain.

As another example, the biosignal acquisition device 10 may be an ECG device for detecting myocardial activity of the heart from each of a plurality of surface areas of the user's body. In this case, the ECG module constituting the biosignal acquisition device 10 may measure a very small activity potential, which is generated in the myocardium as the user's heart beats, through electrodes attached to the body surface and may record and display a variation curve over time so that electrical activity of the heart can be monitored. The aforementioned details of a biosignal acquired through the biosignal acquisition device 10 and modules which may constitute the biosignal acquisition device 10 are only exemplary, and the present disclosure is not limited thereto.

In FIG. 1, the biosignal acquisition device 10 and the computing device 100 are represented as separate entities, but according to various implementation modes of the present disclosure, the biosignal acquisition device 10 may be included in the computing device 100 to perform both a function of acquiring a biosignal and a function of providing analysis information corresponding to a biosignal.

According to an embodiment of the present disclosure, the external server 20 may be a hospital server or a governmental server which stores examination data including information on electronic health records and electronic medical records. The examination data may include, for example, sociodemographic information (e.g., sex, age, and residential area), health coverage type information, socioeconomic level information, disability registration information, physical examination information, EEG signal test information, ECG signal test information, EOG signal test information, EMG signal test information, information on medical history examination by interview, information on medical family history examination by interview, mental test information, information on medical lifestyle examination by interview, information related to mental examination results, such as a depression test and a cognitive function test, and the like. Information stored in the external server 20 may be used as training data, verification data, and test data for training a neural network of the present disclosure. In other words, the external server 20 may be a server which stores datasets for training a deep learning (DL) model of the present disclosure.

The computing device 100 of the present disclosure may receive a training dataset including examination data from the external server 20 and train a DL model including one or more network functions on the basis of the received training dataset to generate a DL model for generating pathological symptom diagnosis information corresponding to a biosignal.

The external server 20 may be a digital device with computing power which includes a processor and a memory such as a laptop computer, a notebook computer, a desktop computer, a web pad, and a cellular phone. The external server 20 may be a web server which processes service. The aforementioned type of server is only exemplary, and the present disclosure is not limited thereto.

According to an embodiment of the present disclosure, the computing device 100 may receive a biosignal of a user from the biosignal acquisition device 10 and generate and provide pathological symptom diagnosis information corresponding to the biosignal to the user terminal 30. Specifically, the computing device 100 may generate a plurality of pieces of video sub-data by preprocessing the biosignal received from the biosignal acquisition device 10. Preprocessing of a biosignal may mean an operation of processing a time-series biosignal so that the signal can be computed through the DL model. Each of the plurality of pieces of video sub-data may be image data including information on the biosignal separated according to each time point of the biosignal. Also, each of the plurality of pieces of video sub-data may be an image obtained by dividing a frequency measured through each of one or more channels according to the location of each channel on the basis of time points.

Also, the computing device 100 may generate one or more pieces of video data by selecting at least two of the plurality of pieces of video sub-data. Video data may be data about a video of which one frame is obtained as each piece of video sub-data by connecting two or more pieces of video sub-data. In other words, when a time-series biosignal is received, the computing device 100 may convert the biosignal into images constituting specific frames and generate video data related to a video representing a change over time by connecting the converted images.

Further, the computing device 100 may generate pathological symptom diagnosis information on the basis of one or more pieces of video data corresponding to the biosignal and provide the diagnostic information. Specifically, the computing device 100 may generate pathological symptom diagnosis information by processing one or more pieces of video data as an input to the DL model. The pathological symptom diagnosis information is predictive information about a pathological mental symptom of the user and may include at least one of, for example, an intellectual disorder, such as dementia, a cognitive disorder, such as illusions and auditory hallucinations, a thought disorder, such as delays of thought, a disorder in thought content, such as delusions, an attention disorder, and an awareness disorder such as distraction. The aforementioned details of predictive information about a pathological symptom are only exemplary, and the present disclosure is not limited thereto. The DL model is a model which outputs pathological symptom diagnosis information from an input of one or more pieces of video data corresponding to the user's biosignal. The DL model may include one or more network functions and may be a model trained with a training dataset.

In other words, the computing device 100 of the present disclosure may generate video data by preprocessing the time-series biosignal acquired from the user to be processible by the DL model and generate pathological symptom diagnosis information corresponding to the user's biosignal by inputting the generated video data to the DL model (i.e., the trained artificial neural network).

In an embodiment, the computing device 100 may be a terminal or a server and may include any type of device. The computing device 100 may be a digital device with computing power which includes a processor and a memory such as a laptop computer, a notebook computer, a desktop computer, a web pad, and a cellular phone. The computing device 100 may be a web server which processes service. The aforementioned type of server is only exemplary, and the present disclosure is not limited thereto.

According to an embodiment of the present disclosure, the computing device 100 may be a server which provides a cloud computing service. More specifically, the computing device 100 may be a server which provides, as Internet-based computing, a cloud computing service of processing information not through the user's computer but through another computer connected to the Internet. The cloud computing service may be a service which enables a user to store data on the Internet and use necessary data or a necessary program through Internet access without installing the data or program on his or her computer. The cloud computing service makes it possible to easily share and transfer data stored on the Internet with simple manipulation and clicking. Also, the cloud computing service may be a service which makes it possible to not only store data in a server on the Internet but also carry out a desired task using a function of an application program provided in the website without additionally installing a program and enables several people to simultaneously carry out a task while sharing a document. Also, the cloud computing service may be implemented in at least one form among infrastructure as a service (IaaS), platform as a service (PaaS), software as a service (SaaS), a virtual machine-based cloud server, and a container-based cloud server. In other words, the computing device 100 of the present disclosure may be implemented in at least one form among the aforementioned cloud computing services. The aforementioned details of the cloud computing service are only exemplary, and the cloud computing service may include an arbitrary platform for building a cloud computing environment of the present disclosure.

A method for the computing device 100 to preprocess a biosignal, train the DL model, and generate pathological symptom diagnosis information corresponding to the biosignal will be described in detail below with reference to FIG. 2.

FIG. 2 is a block diagram of the computing device for providing pathological symptom diagnosis information on the basis of a biosignal according to the embodiment of the present disclosure.

As shown in FIG. 2, the computing device 100 may include a network unit 110, a memory 120, and a processor 130. The aforementioned components included in the computing device 100 are exemplary, and the scope of the present disclosure is not limited thereto. In other words, according to implementation forms of embodiments of the present disclosure, additional components may be included, or some of the aforementioned components may be omitted.

According to the embodiment of the present disclosure, the computing device 100 may include the network unit 110 which transmits and receives data to and from the biosignal acquisition device 10, the external server 20, and the user terminal 30.

The network unit 110 may transmit and receive a biosignal measured from the user according to the embodiment of the present disclosure, analysis information corresponding to the biosignal, a training dataset for training the DL model, etc. to and from another computing device, a server, etc. In other words, the network unit 110 may provide a function for communication with the biosignal acquisition device 10, the external server 20, and the user terminal 30. As an example, the network unit 110 may receive a biosignal of the user from the biosignal acquisition device 10. As another example, the network unit 110 may receive a training dataset for training the DL model from the external server 20. In addition, the network unit 110 may allow information transfer between the computing device 100 and the biosignal acquisition device 10, the external server 20, and the user terminal 30 in a manner of calling a procedure in the computing device 100.

The network unit 110 according to the embodiment of the present disclosure may use various wired communication systems such as a PSTN, an xDSL, an MDSL, a VDSL, a UADSL, a HDSL, and a LAN.

Also, the network unit 110 presented herein may use various wireless communication systems such as a CDMA system, a TDMA system, an FDMA system, an OFDMA system, an SC-FDMA system, and other systems.

In the present disclosure, the network unit 110 may be structured in any communication manner, such as wired communication and wireless communication, and may include various communication networks such as a PAN and a WAN. Also, the network may be the well-known WWW and may employ a wireless transmission technology used in short-range communication such as IrDA or Bluetooth. Technologies described herein may be used not only in the above-described networks but also in other networks.

According to the embodiment of the present disclosure, the memory 120 may store a computer program for performing a method of providing pathological symptom diagnosis information corresponding to a biosignal, and the stored computer program may be read and executed by the processor 130. Also, the memory 120 may store any form of information generated or determined by the processor 130 and any form of information received by the network unit 110. Further, the memory may store information related to the biosignal received from the biosignal acquisition device 10. For example, the memory 120 temporarily or permanently stores input/output data (e.g., training data for training a neural network, a time-series biosignal, information on a plurality of pieces of video sub-data generated by preprocessing the biosignal, and one or more pieces of video data generated by connecting the plurality of pieces of video sub-data).

According to the embodiment of the present disclosure, the memory 120 may include at least one type of storage medium among a flash memory type, a hard disk type, a multimedia card micro-type, a card-type memory (e.g., a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in relation to a web storage which performs a storage function of the memory 120 on the Internet. The above description of the memory is only exemplary, and the present disclosure is not limited thereto.

According to the embodiment of the present disclosure, the processor 130 may include at least one core and may include a processor for data analysis and DL such as a central processing unit (CPU), a general-purpose graphics processing unit (GPGPU), and a tensor processing unit (TPU).

The processor 130 may perform data processing for machine learning according to the embodiment of the present disclosure by reading the computer program stored in the memory 120. According to the embodiment of the present disclosure, the processor 130 may perform computation to train a neural network. The processor 130 may perform calculation for training a neural network such as input data processing for learning in DL, feature extraction from the input data, error calculation, and updating of weights of the neural network through backpropagation.

At least one of the CPU, GPGPU, and TPU of the processor 130 may process learning of network functions. For example, the CPU and the GPGPU together may process learning of network functions and data classification employing network functions. Also, according to the embodiment of the present disclosure, processors of a plurality of computing devices may be used together to process learning of network functions and data classification employing network functions. Further, a computer program executed in a server according to the embodiment of the present disclosure may be executable by a CPU, a GPGPU, or a TPU.

In this specification, a network function may be interchangeably used with an artificial neural network or a neural network. In this specification, a network function may include one or more neural networks, and in this case, an output of the network function may be an ensemble of outputs of the one or more neural networks.

In this specification, a model may include a network function. A model may include one or more network functions, and in this case, an output of the model may be an ensemble of outputs of the one or more neural networks.

The processor 130 may read the computer program stored in the memory 120 and provide the DL model according to the embodiment of the present disclosure. According to the embodiment of the present disclosure, the processor 130 may perform calculation to generate pathological symptom diagnosis information corresponding to a biosignal of the user. According to the embodiment of the present disclosure, the processor 130 may perform calculation to train the DL model.

According to the embodiment of the present disclosure, the processor 130 may generally process overall operations of the computing device 100. The processor 130 may provide appropriate information or an appropriate function to the user terminal 30 or process the appropriate information or function by processing a signal, data, information, etc. input or output through the above-described elements or by executing an application program stored in the memory 120.

According to the embodiment of the present disclosure, the processor 130 may receive a biosignal of the user. The biosignal is a signal acquired in time series from the user's body and may include at least one of an EEG signal and an ECG signal acquired through one or more channels. The processor 130 may receive a biosignal which is acquired by the biosignal acquisition device 10 on the basis of a electric potential difference measured from one or more areas of the user's body through one or more electrodes. For example, the biosignal may include at least one of an EEG signal and an ECG signal.

As a specific example, the biosignal may be an EEG signal measured when a plurality of electrodes, which form 19 channels provided in the biosignal acquisition device 10, separately come into contact with a plurality of areas in the user's scalp. As another example, the biosignal may be an ECG signal measured when a plurality of electrodes, which form 12 channels provided in the biosignal acquisition device 10, separately come into contact with the vicinity of the heart, the wrists, and the ankles of the user. In other words, the biosignal may include an EEG signal, an ECG signal, or the like measured from the user's body over time. The details of the user's body areas which come into contact with the biosignal acquisition device, the number of channels, and details of the biosignal are only exemplary, and the present disclosure is not limited thereto.

The processor 130 may receive the biosignal through the network unit 110. Receiving the biosignal according to the embodiment of the present disclosure may be receiving or loading the biosignal stored in the memory 120. Receiving the biosignal may be receiving or loading the biosignal from another storage medium, another computing device, or a separate processing module in the same computing device on the basis of a wired/wireless communication unit. In the embodiment, the computing device 100 may include the biosignal acquisition device 10. In this case, the processor 130 may acquire the biosignal on the basis of a electric potential difference measured from one or more areas of the user's body through a plurality of electrodes provided in the computing device 100.

According to the embodiment of the present disclosure, the processor 130 may generate a plurality of pieces of video sub-data by preprocessing the biosignal. Preprocessing the biosignal may be processing the biosignal to be computable through the DL model. Specifically, the processor 130 may generate one or more spectrograms by performing a frequency conversion on each of one or more biosignals each acquired from one or more channels on the basis of a frequency of a predetermined range. In this case, the frequency conversion may include short-time Fourier transform (STFT). STFT may mean decomposition of a function or signal of time into frequency components so that a user may know which frequencies are present in each time period. A spectrogram is a visual way of understanding a sound or wave and may be related to an image representing a combination of characteristics of a waveform and a spectrum. A spectrogram may represent a difference in amplitude with a difference in print concentration or displayed color along a time axis and a frequency axis. For example, the frequency of the predetermined range may be 1 Hz to 45 Hz, and each matrix may be based on a biosignal measured for four seconds or more. In the embodiment, when a measured time is less than four seconds, the processor 130 may configure the size of a spectrogram into a square matrix through overlapping. The processor 130 may calculate a relative power (a relative intensity during the corresponding time period) of each spectrogram configured into a square matrix on the basis of the time axis and perform scaling between −1 and 1 on the basis of the largest value in each matrix so that one or more spectrograms may be generated. The aforementioned values related to a spectrogram are only exemplary, and the present disclosure is not limited thereto.

In other words, each of the one or more spectrograms is image data classified by one or more channels as shown in FIG. 3 and may be an image which represents a frequency variation over time with a difference in print concentration or displayed color. The processor 130 may acquire a biosignal through one or more channels that each correspond to the one or more areas of the user's body and generate one or more spectrograms on the basis of the biosignal acquired through each of the channels. For example, when biosignals are acquired through three channels from the user, three spectrograms corresponding to the biosignals may be generated, and when biosignals are acquired through five channels from the user, five spectrograms corresponding to the biosignals may be generated. As a specific example, the processor 130 may generate a first spectrogram 210 on the basis of a biosignal measured through electrodes which form a first channel, generate a second spectrogram 220 on the basis of a biosignal measured through electrodes which form a second first channel, and generate a third spectrogram 230 on the basis of a biosignal measured through electrodes which form a third channel. The aforementioned number of channels and spectrograms are only exemplary, and the present disclosure is not limited thereto.

In another embodiment of the present disclosure, a frequency conversion which is performed by the processor 130 to generate one or more spectrograms on the basis of each of one or more biosignals may include a wavelet transform. A wavelet transform is generating a spectrogram corresponding to a signal by using a wavelet function which is limited in time as a basic function. For example, with regard to a signal of a low-frequency component, a frequency resolution may be increased, and a time resolution may be reduced, and with regard to a signal of a high-frequency component, a time resolution may be increased, and a frequency resolution may be reduced. Unlike a Fourier transform employing a sine curve which is infinite in time as a basic function, a wavelet transform employs various wavelet functions which are limited in time as a basic function, and thus it is possible to flexibly process various types of signals. In the embodiment, a wavelet transform through the processor 130 may be a super-resolution using wavelet transform. In the case of a super-resolution using wavelet transform, a spectrogram, which is not transformed according to time length and frequency size and has natural transition, can be generated. In other words, it is possible to efficiently represent a change over time and frequency. This may minimize noise between frequencies in a process of generating a plurality of pieces of video sub-data which are used as one frame in the present disclosure.

According to the embodiment of the present disclosure, the processor 130 may generate a plurality of pieces of video sub-data by rearranging one or more spectrograms. Specifically, the processor 130 may identify one or more frequencies acquired through each channel at the same time point. Also, the processor 130 may generate a plurality of pieces of video sub-data by rearranging the one or more frequencies, which are identified to be acquired through each channel at the same time point, on the basis of the location of each of one or more channels. Each of the plurality of pieces of video sub-data may be image data distinguished by time point and may be an image which represents a frequency measured through each of the one or more channels according to the location of each of the one or more channels.

More specifically, each spectrogram may include information on a frequency measured from each channel over time. In this case, the processor 130 may generate each piece of video sub-data by rearranging frequencies each acquired through the channels at the same time point on the basis of domains of the channels.

As a specific example, biosignals may be EEG signals acquired from a plurality of areas (i.e., 19 areas) in the user's scalp through a plurality of electrode forming 19 channels. As described above, these biosignals may be converted by the processor 130 into one or more spectrograms which are classified by channel. In this case, since the 19 channels are formed, the processor 130 may generate 19 spectrograms that each correspond to the channels on the basis of the biosignals acquired through each of the channels. As shown in FIG. 4, the processor 130 may generate first video sub-data 310 by rearranging frequencies identified to be acquired through the channels at a first time point on the basis of locations of the channels (i.e., locations corresponding to the user's scalp), generate second video sub-data 320 by rearranging frequencies identified to be acquired through the channels at a second time point on the basis of locations of the one or more channels, and generate third video sub-data 330 by rearranging frequencies identified to be acquired through the channels at a third time point on the basis of locations of the one or more channels. In other words, one piece of video sub-data may be an image which represents a frequency measured from each area of the user's scalp at a specific time point. For example, when the first video sub-data 310 is generated by rearranging a frequency acquired through each channel at the specific time point on the basis of the location of each channel, the first video sub-data 310 may represent brain activity corresponding to the shape of the user's brain. That is, a left area 311 of the first video sub-data may be related to activity of the user's left brain, and a right area 312 may be related to activity of the user's right brain. In other words, one piece of video sub-data may be an image which represents electrical activity of the brain corresponding to each area at the specific time point. The above-described details of the method of generating a plurality of pieces of video sub-data are only exemplary, and the present disclosure is not limited thereto.

That is, the processor 130 may generate one or more pieces of video sub-data by rearranging frequencies of one or more spectrograms, which are classified by channel, on the basis of time points. One piece of video sub-data generated by the processor 130 is obtained by rearranging frequencies measured through one or more channels at the same time point on the basis of the location of each channel, and the plurality of pieces of video sub-data may be a combination of pieces of video sub-data distinguished by time point. In other words, video sub-data may be information including information related to channel-specific connectivity as well as information on the frequency domain.

According to the above-described method, a symmetric image may be generated as shown in FIG. 4. For example, in the case of 19 channel EEG information based on a 10-20 system, 11 channels including three common channels (e.g., Fz, Cz, and Pz) may be arranged on each of the left and right sides. In this case, a frequency which is used ranges from 1 Hz to 45 Hz, and pieces of data which are accumulated in time series after rearrangement may represent a symmetric image of which left and right sides are shown to be symmetrical. Such an image includes channel-specific topologic information as well as the entire frequency domain so that all information can be checked at once.

However, a method of generating a plurality of pieces of video sub-data is not limited to the above-described symmetric image, and various images, such as a topology image and a time-frequency image, may be used as video sub-data to generate video data.

Also, as data used in representing the above-described symmetric image, the absolute power of mV2, the absolute value of dB/Hz, and the relative value of % may be used.

In the present disclosure, the plurality of pieces of video sub-data may be generated according to a time point (or over time). For example, when a biosignal is measured for a longer time, a larger number of pieces of video sub-data may be generated.

According to the embodiment of the present disclosure, the processor 130 may select at least two of the plurality of pieces of video sub-data to generate one or more pieces of video data. The video data may be data related to a video of which one frame is obtained as each piece of video sub-data by connecting two or more pieces of video sub-data.

Specifically, the processor 130 may identify the number of the plurality of pieces of video sub-data. Also, the processor 130 may set a first time interval on the basis of the number of the plurality of pieces of video sub-data. The processor 130 may select at least two of the plurality of pieces of video sub-data at the first time intervals based on the piece of video sub-data of an initial time point. Also, the processor 130 may generate first video data by connecting the selected at least two pieces of video sub-data on the basis of a time point.

The number of the plurality of pieces of video sub-data may be determined over time (or according to a time point). For example, when a biosignal is measured (or acquired) for a long time, the number of the plurality of pieces of video sub-data generated by the processor 130 may increase, and when a biosignal is measured for a short time, the number of the plurality of pieces of video sub-data generated by the processor 130 may decrease. Accordingly, the processor 130 may identify the number of the plurality of pieces of video sub-data and set the first time interval which is a criterion for selecting two or more pieces of video sub-data. The processor 130 may set the first time interval to have a positive relationship with (i.e., to be proportional to) the number of pieces of video sub-frames. Specifically, when the number of pieces of video sub-data is large (e.g., 80), the processor 130 may set the first time interval to be relatively long (e.g., eight seconds), and when the number of pieces of video sub-data is small (e.g., 30), the processor may set a second time interval to be relatively short (e.g., three seconds).

In other words, the processor 130 may determine the minimum number of pieces of video sub-data required for generating video data by setting the time interval to be proportional to the number of pieces of video sub-data. For example, when 10 pieces of video sub-data are generated every second and the first time interval is two seconds, the processor 130 may select five pieces of video sub-data (i.e., a first piece of video sub-data, a third piece of video sub-data, a fifth piece of video sub-data, a seventh piece of video sub-data, and a ninth piece of video sub-data) on the basis of the initial piece of video sub-data and connect the pieces of video sub-data on the basis of time points to generate first video data. In this case, the first video data may be the five pieces of video sub-data arranged in chronological order to visualize a variation of a frequency measured at each area of the user's body according to a change in time point. The aforementioned numbers and values related to the pieces of video sub-data, the first time interval, and the video data are only exemplary, and the present disclosure is not limited thereto.

Also, the processor 130 may select at least two of the plurality of pieces of video sub-data at the first time intervals based on the piece of video sub-data different from the piece of video sub-data of the initial time point. Then, the processor 130 may generate second video data by connecting the selected at least two pieces of video sub-data on the basis of time points. In this case, the second video data may include video sub-data which is at least partially different from the first video data.

As a specific example, when the number of pieces of video sub-data generated every second is 10 and the first time interval is set to two seconds, the processor 130 may select five pieces of video sub-data (a second piece of video sub-data, a fourth piece of video sub-data, a sixth piece of video sub-data, an eighth piece of video sub-data, and a tenth piece of video sub-data) on the basis of the second piece of video sub-data rather than the piece of video sub-data of the initial time point and connect the pieces of video sub-data on the basis of time points to generate second video data. In other words, the second video data may include information corresponding to time points different from those of the first video data. The aforementioned numbers and values related to the pieces of video sub-data, the first time interval, and the video data are only exemplary, and the present disclosure is not limited thereto.

Also, the processor 130 may set a second time interval different from the first time interval. The processor 130 may select at least two of the plurality of pieces of video sub-data on the basis of the second time interval. The processor 130 may generate third video data by connecting the selected at least two pieces of video sub-data on the basis of time points. In this case, the third video data may include video sub-data which is at least partially different from each of the first video data and the second video data.

As a specific example, when the number of pieces of video sub-data generated every second is 10 and the first time interval is set to two seconds, the processor 130 may set the second time interval to three seconds which differs from the first time interval. In this case, the processor 130 may select three pieces of video sub-data (the first piece of video sub-data, the fourth piece of video sub-data, and the seventh piece of video sub-data) on the basis of the initial piece of video sub-data and connect the pieces of video sub-data on the basis of time points to generate third video data. In other words, the third video data may include information corresponding to time points different from those of each of the first video data and the second video data. The aforementioned numbers and values related to the pieces of video sub-data, the first time interval, the second time interval, and the video data are only exemplary, and the present disclosure is not limited thereto.

Also, the processor 130 may set an arbitrary time interval. The processor 130 may select at least two of the plurality of pieces of video sub-data on the basis of the arbitrary time interval. The processor 130 may generate fourth video data by connecting the selected at least two pieces of video sub-data on the basis of time points. In this case, the fourth video data may include video sub-data which is at least partially different from each of the first video data, the second video data, and the third video data.

As a specific example, when the number of pieces of video sub-data generated every second is 10, the processor 130 may select three pieces of video sub-data (the second piece of video sub-data, the fifth piece of video sub-data, and the sixth piece of video sub-data) at the arbitrary time intervals and connect the pieces of video sub-data on the basis of time points to generate fourth video data. The aforementioned arbitrary time interval is only exemplary, and the present disclosure is not limited thereto.

Also, the processor 130 may set a first time interval and an arbitrary time interval. Then, first, the processor 130 may generate first video aux-data according to the first time interval, generate second video aux-data by selecting at least two pieces of the video sub-data which are not selected according to the arbitrary time interval, and generate fifth video data by combining the first video aux-data and the second video aux-data in chronological order.

As a detailed example, when the number of pieces of video sub-data generated every second is 10, the processor 130 may select three pieces of video sub-data (the first piece of video sub-data, the fifth piece of video sub-data, and the ninth piece of video sub-data) at the first time intervals and connect the three pieces of video sub-data selected at the first time intervals on the basis of time points to generate first video aux-data. In parallel with the above process, the processor 130 may select three pieces of video sub-data (the second piece of video sub-data, the fourth piece of video sub-data, and the seventh piece of video sub-data) at the arbitrary time intervals from among the pieces of video sub-data which are not selected for the first video aux-data and connect the three pieces of video sub-data selected at the arbitrary time intervals on the basis of time points to generate second video aux-data. In the same process, the first video aux-data and the second video aux-data may be combined in chronological order of the pieces of video sub-data to generate fifth video data.

Also, the processor 130 may set a first time interval and an arbitrary time interval. Then, first, the processor 130 may generate first video aux-data according to the first time interval, generate second video aux-data by selecting at least two pieces of the video sub-data regardless of pieces of video sub-data selected for the first video aux-data, and generate sixth video data by combining the first video aux-data and the second video aux-data in chronological order.

As a detailed example, when the number of pieces of video sub-data generated every second is 10, the processor 130 may select three pieces of video sub-data (the first piece of video sub-data, the fifth piece of video sub-data, and the ninth piece of video sub-data) at the first time intervals and connect the three pieces of video sub-data selected at the first time intervals on the basis of time points to generate first video aux-data. In parallel with the above process, the processor 130 may select three pieces of video sub-data (the first piece of video sub-data, the fourth piece of video sub-data, and the seventh piece of video sub-data) at the arbitrary time intervals and connect the three pieces of video sub-data selected at the arbitrary time intervals on the basis of time points to generate second video aux-data. In the same process, the first video aux-data and the second video aux-data may be combined in chronological order of the pieces of video sub-data to generate sixth video data.

In other words, the processor 130 may generate a plurality of pieces of video sub-data, which are distinguished by time point, on the basis of biosignals measured from the user and generate one or more pieces of video data by connecting the plurality of pieces of video sub-data on the basis of various criteria or time intervals. In other words, a plurality of pieces of video data including different frames (i.e., pieces of different video sub-data) may be generated on the basis of biosignals measured from one user. Also, since video data generated by the processor 130 includes information on a change pattern over time (i.e., all video sub-data), it is possible to prevent information loss in the case of providing analysis information.

According to the embodiment of the present disclosure, the processor 130 may generate a DL model by training one or more network functions. In other words, the DL model includes one or more network functions and may be trained with a training dataset including a training input dataset and a training output dataset. Such a training dataset may be information received from the external server 20. The training dataset may be, for example, examination data including information and the like on electronic health records and electronic medical records. The processor 130 may build a training dataset including a training input dataset and a training output dataset on the basis of examination data of each of a plurality of users received from the external server 20. The training input dataset may include a plurality of pieces of video sub-data which are generated on the basis of biosignals each measured from the plurality of users in time series. The training output dataset may include a plurality of pieces of video diagnosis information that each correspond to the plurality of users.

As an example, the processor 130 may generate labeled training data by matching one or more pieces of video data (i.e., training input data) corresponding to an EEG signal in examination data of a first user to treatment data (i.e., training result data) corresponding to the EEG signal. As another example, the processor 130 may generate label training data by matching one or more pieces of video data corresponding to an ECG signal in examination data of a second user to treatment data corresponding to the ECG signal.

Also, training may be performed by additionally relating the user's metadata (e.g., age, sex, and clinical tests) to characteristics extracted from input data (i.e., video data), or the user's metadata may be additionally learned.

According to the embodiment of the present disclosure, the processor 130 may extract information on biosignals from examination data of each of a plurality of users and preprocess the extracted information on biosignals to generate a plurality of pieces of video sub-data. Also, the processor 130 may generate video data by connecting at least two of a plurality of pieces of video sub-data and thereby build a training dataset. In the present disclosure, training data with which the DL model is trained is actual examination data of each of a plurality of users over the course of many years. Accordingly, training data is not arbitrarily increased enough to train a neural network and is difficult to obtain due to protection of personal information and the like. When training data for training a neural network is insufficiently obtained, the accuracy of the trained neural network may be slightly lowered, or training of the neural network may be impossible. Also, in the case of obtaining additional training data by arbitrarily modifying information on biosignals of a specific user, data may become invalid due to arbitrary modifications, or undesired outputs may be calculated in a neural network training process.

The processor 130 of the present disclosure may generate a plurality of pieces of video sub-data distinguished by time point on the basis of biosignals measured from the user and generate one or more pieces of video data by connecting the plurality of pieces of video sub-data on the basis of various criteria or time intervals. In other words, a plurality of pieces of video data including different frames (i.e., pieces of different video sub-data) may be generated on the basis of biosignals measured from one user. That is, since a plurality of pieces of training data (i.e., a plurality of pieces of video data) can be generated from examination data of one user, augmentation of training data is possible. Accordingly, accuracy of neural network training can be increased through the augmented training data, and output accuracy of a trained neural network can be increased.

In particular, augmented data acquired in this way is not artificially generated but is obtained as a plurality of pieces of data by augmenting actual data according to a combination method.

In an additional embodiment, the processor 130 may provide an effect of reducing computing power by optimally determining the number of two or more pieces of video sub-data for generating video data.

Also, the processor 130 may input each training input dataset to one or more network functions and calculate an error by comparing each output data calculated through the one or more network functions with each training output dataset corresponding to the label of each training input dataset. Then, the processor 130 may adjust weights of the one or more network functions in a backpropagation manner on the basis of the calculated errors. In other words, the processor 130 may adjust weights on the basis of errors between calculation results of one or more network functions from training input data and training output data so that outputs of the one or more network functions may become close to the training output data.

Also, when training of one or more network functions is performed for a predetermined epoch or more, the processor 130 may determine whether to stop training using verification data. The predetermined epoch may be a part of an overall learning goal epoch. The verification data may be at least a part of a labeled training dataset. In other words, the processor 130 trains a neural network through a training dataset and after training of the neural network is repeated for the predetermined epoch or more, the processor 130 may determine whether the learning effect of the neural network is a predetermined level or higher using the verification data. For example, when training of which a target iterative learning number is 10 is performed using 100 pieces of training data, the processor 130 may perform iterative training corresponding to the predetermined epoch ten times and then perform iterative learning using 10 pieces of verification data three times. When a change in the output of the neural network is the predetermined level or lower during the iterative learning three times, the processor 130 may determine that any more training is meaningless and finish training. In other words, the verification data may be used to determine completion of iterative neural network training on the basis of whether the effect of epoch-specific training is a certain level or more or less. The aforementioned number and iteration number of pieces of training data and pieces of verification data are only exemplary, and the present disclosure is not limited thereto.

Also, the processor 130 may test performance of the one or more network functions using a test dataset, determine whether to activate the one or more network functions, and thereby generate a DL model.

When it is determined whether to activate the one or more network functions by testing the performance of the one or more network functions with the test dataset, a DL model may be generated. Test data may be used to verify performance of a neural network and may include at least a part of the training dataset. For example, 70% of the training dataset may be used to train a neural network (i.e., learning for adjusting weights so that the neural network may output a result value similar to the label), and 30% thereof may be used as test data for verifying performance of the neural network. The processor 130 may input a test dataset to the neural network which has finished learning, measure an error, and determine whether to activate the neural network on the basis of whether the performance is predetermined performance or higher. The processor 130 may verify the performance of the neural network which has finished learning using test data on the neural network which has finished learning and activate the neural network to be used by another application when performance of the neural network which has finished learning is a predetermined reference or higher. Also, when the performance of the neural network which has finished learning is the predetermined reference or lower, the processor 130 may deactivate and discard the neural network. For example, the processor 130 may determine performance of a generated neural network model on the basis of elements such as accuracy, precision, and recall. The aforementioned performance evaluation elements are only exemplary, and the present disclosure is not limited thereto. According to the embodiment of the present disclosure, the processor 130 may generate a plurality of neural network models by separately training neural networks, evaluate performance of the plurality of neural network models, and only use neural networks having a certain level of performance to calculate pathological symptom diagnosis information.

In the present disclosure, data corresponding to training input data may be video data which is generated by connecting (or combining) a plurality of pieces of video sub-data generated by preprocessing biosignals. In other words, training data of the DL model may be data which visualizes a variation of a frequency measured at each area of the user's body according to a change in time point rather than simple image data. Accordingly, training a DL model according to the present disclosure may not mean training for simply outputting analysis information corresponding to an image of a specific time point but may mean training for outputting meaningful analysis information according to the flow of a video based on time points. In other words, a video representing a variation over time can be learned (e.g. a pattern of brainwave change over time may be learned). That is, a DL model which is trained using one or more pieces of video data generated by preprocessing biosignals as training input data may provide meaningful analysis information corresponding to a variation according to the time of each frame.

According to the embodiment of the present disclosure, the processor 130 may generate pathological symptom diagnosis information by processing one or more pieces of video data as an input to the DL model. In this case, as described above, the DL model may mean one or more network functions trained with a training dataset.

The pathological symptom diagnosis information may be predictive information about a pathological mental symptom corresponding to the user. For example, pathological symptom diagnosis information may be information that a specific user corresponds to an intellectual disorder, such as dementia, a cognitive disorder, such as illusions and auditory hallucinations, a though disorder, such as delays of thought, a disorder in thought content, such as delusions, an attention disorder, and an awareness disorder such as distraction. As a specific example, pathological symptom diagnosis information may include information that a first user has a 70% probability of developing dementia within three years. The details of pathological symptom diagnosis information are only exemplary, and the present disclosure is not limited thereto. In other words, it is possible to generate diagnostic information on the basis of a user's biosignals without additionally performing a magnetic resonance imaging (MRI) scan, a Montreal cognitive assessment (MoCA) test, or the like for diagnosing a pathological symptom. This may lead to an increase in efficiency in terms of cost and time and also improve a user's accessibility to prediction of a pathological mental symptom.

According to the embodiment of the present disclosure, the processor 130 may generate one or more pieces of pathological symptom diagnosis information by processing each of one or more pieces of video data as an input to the DL model. Also, the processor 130 may generate integrated diagnostic information by integrating the one or more pieces of pathological symptom diagnosis information generated through the DL model.

As a specific example, the processor 130 may generate a plurality of pieces of video sub-data corresponding to a biosignal of a first user and generate one or more pieces of video data by connecting the plurality of pieces of video sub-data on the basis of different criteria or time intervals. For example, the processor 130 may generate three pieces of video data (first video data, second video data, and third video data) including different pieces of video sub-data according to the biosignal of the first user. The processor 130 may generate first pathological symptom diagnosis information that the first user has a 70% probability of developing dementia by processing the first video data corresponding to the first user's biosignal as an input to the DL model. Also, the processor 130 may generate second pathological symptom diagnosis information that the first user has a 74% probability of developing dementia by processing the second video data corresponding to the first user's biosignal as an input to the DL model. The processor 130 may generate third pathological symptom diagnosis information that the first user has a 63% probability of developing dementia by processing the third video data corresponding to the first user's biosignal as an input to the DL model. In this case, the processor 130 may generate integrated diagnostic information by integrating the pieces of pathological symptom diagnosis information. For example, the processor 130 may generate integrated diagnostic information that a probability of developing dementia is 69% by averaging the predictive values (i.e., 70%, 74%, and 63%) of the pieces of pathological symptom diagnosis information. The aforementioned details of pathological symptom diagnosis information and integrated diagnostic information are only exemplary, and the present disclosure is not limited thereto.

In other words, instead of analysis information corresponding to one piece of video data, integrated diagnostic information is calculated in consideration of all of a plurality of pieces of pathological symptom diagnosis information each output according to a plurality of pieces of video data so that accuracy in predicting a pathological symptom of a user can be improved.

FIG. 5 is a schematic diagram of network functions according to an embodiment of the present disclosure.

Throughout this specification, an arithmetic model, a neural network, and a network function may be used as the same meaning. A neural network may generally be a set of mutually connected calculation units which may be referred to as "nodes." Such "nodes" may also be referred to as "neurons." A neural network includes at least one node. Nodes (or neurons) constituting neural networks may be connected to each other through one or more "links."

In a neural network, one or more nodes connected through links may relatively form the relationship between an input node and an output node. An input node and an output node are relative concepts. A node having an output node relationship with one node may have an input node relationship with another node, and the reverse relationship is also available. As described above, the relationship between an input node and an output node may be generated on the basis of a link. One or more output nodes may be connected to one input node through a link, and the reverse case may also be possible.

In the relationship between an input node and an output node connected through one link, a value of the output node may be determined on the basis of data input to the input node. Here, a node connecting the input node and the output node may have a weight. The weight may be variable and varied by a user or an algorithm in order for the neural network to perform a desired function. For example, when one or more input nodes are connected to one output node through separate links of the input nodes, the output node may determine a value thereof on the basis of values input to the input nodes connected to the output node and weights set in the links corresponding to the input nodes.

As described above, in the neural network, two or more nodes are connected to each other through one or more links to form the relationship of an input node and an output node. A characteristic of the neural network may be determined according to the numbers of nodes and links, a correlation between the nodes and the links, and weights each assigned to the links. For example, when there are two networks in which the same number of nodes and the same number of links are present and links have different weights, the two neural networks may be recognized as being different from each other.

The neural network may include one or more nodes. Some of the nodes constituting the neural network may constitute one layer on the basis of distances from an initial input node. For example, a set of nodes having a distance n from the initial input node may constitute n layers. The distance from the initial input node may be defined by the minimum number of links that are passed from the initial input node to reach a corresponding node. However, the definition of the layer is arbitrary for the purpose of description, and the order of a layer in the neural network may be defined in a different way from the foregoing method. For example, layers of nodes may also be defined by a distance from a final output node.

The initial input node may mean one or more nodes to which data is directly input without passing through a link in relationships with other nodes among nodes in the neural network. Alternatively, the initial input node may mean nodes which do not have other input nodes connected through links in link-based relationships between nodes in the neural network. Similarly, the final output node may be one or more nodes which do not have an output node in relationships with other nodes among the nodes in the neural network. Further, hidden nodes may mean nodes which constitute the neural network but are not the initial input node or the final output node. A neural network according to the embodiment of the present disclosure may be a neural network in which the number of nodes of an input layer may be identical to the number of nodes of an output layer and the number of nodes is decreased and then increased from the input layer to a hidden layer. Also, a neural network according to another embodiment of the present disclosure may be a neural network in which the number of nodes in an input layer is smaller than the number of nodes in an output layer and the number of nodes is decreased from the input layer to a hidden layer. Further, a neural network according to still another embodiment of the present disclosure may be a neural network in which the number of nodes in an input layer may be larger than the number of nodes in an output layer and the number of nodes is increased from the input layer to a hidden layer. A neural network according to yet another embodiment of the present disclosure may be a neural network obtained by combining the above-described neural networks.

A deep neural network (DNN) may mean a neural network including a plurality of hidden layers excluding an input layer and an output layer. A DNN may be used to find latent structures of data. In other words, it is possible to find latent structures of a photograph, text, a video, voice, and music (e.g., what kind of object is in the photograph, what the text is about and which emotion the text is of, and what the voice is about and which emotion the voice is of). DNNs may include a convolutional neural network (CNN), a recurrent neural network (RNN), an auto encoder, a generative adversarial network (GAN), a restricted Boltzmann machine (RBM), a deep belief network (DBN), a Q network, a U network, a Siamese network, and the like. The aforementioned DNNs are only exemplary, and the present disclosure is not limited thereto.

A neural network may be trained with at least one of supervised learning, unsupervised learning, and semi-supervised learning. Training a neural network is intended to minimize errors of outputs. Training a neural network is a process of repeatedly inputting training data to the neural network, calculating an error between an output of the neural network with respect to the training data and a target, and backpropagating the error of the neural network from an output layer of the neural network toward an input layer to reduce the error so that the weight of each node of the neural network may be updated. In the case of supervised learning, training data (i.e., labeled training data) labeled with a correct answer is used for each piece of training data, and in the case of unsupervised learning, each piece of training data may not be labeled with a correct answer. As an example, in the case of supervised learning for data classification, each piece of training data may be labeled with a category. The labeled training data is input to the neural network, and an error may be calculated by comparing an output (category) of the neural network and the label of the training data. As another example, in the case of unsupervised learning for data classification, an error may be calculated by comparing training data which is an input with an output of the neural network. The calculated error is backpropagated in the reverse direction (i.e., from the output layer toward the input layer) in the neural network, and the connection weight of each node in each layer of the neural network may be updated with the backpropagation. A variation of the updated connection weight of each node may be determined according to a learning rate. The calculation of the neural network for input data and the backpropagation of the error may constitute a learning epoch. The learning rate may be differently applied depending on the iteration number of a learning epoch of the neural network. For example, at the initial stage of learning of the neural network, the neural network quickly ensures a predetermined level of performance using a high learning rate to increase efficiency, and at the late stage of learning, a low learning rate may be used to increase the accuracy.

In the learning of a neural network, training data may generally be a subset of actual data (i.e., data to be processed using the trained neural network). Accordingly, there may be a learning epoch in which an error resulting from the training data is reduced but an error resulting from actual data is increased. For example, a neural network which learns "a cat" through a yellow cat does not recognize a cat other than a yellow cat as a cat, which may be overfitting. To prevent overfitting, various optimization methods may be used. To prevent overfitting, the number of pieces of training data may be increased, or regularization, dropout, which is a method of omitting some nodes of a network during a learning process, etc. may be used.

FIG. 6 is a flowchart illustrating a method of providing pathological symptom diagnosis information on the basis of a biosignal according to an embodiment of the present disclosure.

According to the embodiment of the present disclosure, the computing device 100 may receive a user's biosignals (510).

According to the embodiment of the present disclosure, the computing device 100 may generate a plurality of pieces of video sub-data by preprocessing the biosignals (520).

According to the embodiment of the present disclosure, the computing device 100 may generate one or more pieces of video data by selecting at least two of the plurality of pieces of video sub-data (530).

According to the embodiment of the present disclosure, the computing device 100 may generate pathological symptom diagnosis information by processing the one or more pieces of video data as an input to the DL model (540).

The order of the above-described steps shown in FIG. 6 may be changed as necessary, and at least one step may be omitted or added. In other words, the above-described steps only correspond to the embodiment of the present disclosure, and the scope of the present disclosure is not limited thereto.

Steps of the method or algorithm described in connection with embodiments of the present disclosure may be directly implemented as hardware, implemented as a software module executed by hardware, or a combination thereof. The software module may reside in a RAM, a ROM, an erasable programmable read-only memory (EPROM), an EEPROM, a flash memory, a hard disk, a detachable disk, a compact disk (CD)-ROM, or an arbitrary form of computer-readable recording medium well known in the technical field to which the present disclosure pertains.

Elements of the present disclosure may be implemented as a program (or application) and stored in a medium so as to be executed in combination with a computer which is hardware. Elements of the present disclosure may be executed through software programming or software elements. Similarly, the embodiments may be implemented with a programming or scripting language such as C, C++, Java, and assembler. Functional aspects may be implemented as an algorithm executed in one or more processors.

Those of ordinary skill in the art will appreciate that various illustrative logical blocks, modules, processors, units, circuits, and algorithm steps described in relation to the embodiments disclosed herein may be implemented by electronic hardware (for convenience, referred to as "software" herein), various forms of program or design code, or a combination thereof. To clearly describe such compatibility of hardware and software, various illustrative components, blocks, modules, circuits, and steps are generally described above in relation to the functions of the hardware and the software. Whether the function is implemented as hardware or software depends on design restrictions given to a specific application or an entire system. Those of ordinary skill in the art may implement a function described in various ways for each specific application, but it should not be construed that the determination of implementation departs from the scope of the present disclosure.

Various embodiments presented herein may be implemented by a method, a device, or a manufactured article employing standard programming and/or engineering technology. The term "manufactured article" includes computer programs, carriers, or media accessible from a computer-readable device. For example, computer-readable storage media include a magnetic storage device (e.g., a hard disk, a floppy disk, and a magnetic strip), an optical disk (e.g., a CD and a digital versatile disk (DVD)), a smart card, and a flash memory device (e.g., an EEPROM, a card, a stick, and a key drive) but are not limited thereto. Also, various storage media presented herein include one or more devices and/or other machine-readable media for storing information. The term "machine-readable media" includes a wireless channel and various other media which can store, posses, and/or transfer command(s) and/or data but are not limited thereto.

It will be appreciated that a specific order or a hierarchical structure of steps in the presented processes is one example of illustrative approaches. It will be appreciated that the specific order or the hierarchical structure of the steps in the processes within the scope of the present disclosure may be rearranged on the basis of design priorities. Appended method claims provide elements of various steps in a sample order, but this does not mean that the method claims are limited to the presented specific order or hierarchical structure.

The description of the presented embodiments is provided so that those of ordinary skill in the art of the present disclosure may use or implement the present disclosure. Various modifications of the embodiments will be apparent to those of ordinary skill in the art, and general principles defined herein may be applied to other embodiments without departing from the scope of the present disclosure. Accordingly, the present disclosure is not limited to the embodiments presented herein, and rather, the present disclosure should be interpreted within the widest range of meaning consistent with the principles and new characteristics presented herein

MODES OF THE INVENTION

Modes of the present disclosure have been described in Best Mode of the Invention.

INDUSTRIAL APPLICABILITY

The present disclosure can be used in a field in which a disease or an illness is predicted on the basis of a user's biosignals to provide diagnostic information.

What is claimed is:

1. A method of generating video data for diagnosing a health condition and a pathological symptom on the basis of a biosignal, which is performed by a processor of a computing device, the method comprising:
   receiving, by the processor, biosignals of a user;
   preprocessing, by the processor, the biosignals to generate a plurality of pieces of video sub-data; and
   selecting, by the processor, at least two of the plurality of pieces of video sub-data to generate one or more pieces of video data,
   wherein the biosignals are signals acquired in time-series from the user's body and includes one or more of an electroencephalography signal and an electrocardiogram signal acquired through one or more channels, and
   the receiving of the biosignals of the user comprises acquiring the biosignals through a plurality of electrodes on the basis of an electric potential difference measured from one or more areas of the user's body.

2. The method of claim 1, wherein the biosignals includes signals acquired in time series from the user's body through one or more channels, and
   the preprocessing of the biosignals comprises:
   performing a frequency conversion on each of one or more of the biosignals each acquired from the one or more channels on the basis of a frequency of a predetermined range to generate one or more spectrograms; and
   generating the plurality of pieces of video sub-data by rearranging the one or more spectrograms, and
   the one or more spectrograms are image data classified according to the one or more channels, and each of the spectrograms is an image representing a frequency at each time point.

3. The computer program method of claim 2, wherein the generating of the plurality of pieces of video sub-data comprises:
   identifying one or more frequencies acquired through each of the channels at the same time point; and
   rearranging the one or more frequencies identified to be acquired through each of the channels at the same time point on the basis of locations of the one or more channels to generate the plurality of pieces of video sub-data, and
   the plurality of pieces of video sub-data are image data distinguished by time point and are images representing frequencies each measured through the one or more channels according to the locations of the one or more channels.

4. The method of claim 1, wherein the selecting of the at least two of the plurality of pieces of video sub-data comprises:
   identifying the number of the plurality of pieces of video sub-data;
   setting a first time interval on the basis of the number of the plurality of pieces of video sub-data;
   selecting at least two of the plurality of pieces of video sub-data at the set first time intervals based on the piece of video sub-data of an initial time point; and
   connecting the selected at least two pieces of video sub-data on the basis of time points to generate first video data, and
   the video data is data related to a video of which one frame is obtained as each of the pieces of video sub-data by connecting the two or more pieces of video sub-data.

5. The method of claim 4, wherein the selecting of the at least two of the plurality of pieces of video sub-data comprises:
   selecting at least two of the plurality of pieces of video sub-data at the set first time intervals based on the piece of video sub-data different from the piece of video sub-data of the initial time point; and
   connecting the selected at least two pieces of video sub-data on the basis of time points to generate second video data, and
   the second video data includes video sub-data which is at least partially different from the first video data.

6. The method of claim 4, wherein the selecting of the at least two of the plurality of pieces of video sub-data comprises:
   setting a second time interval different from the first time interval;
   selecting at least two of the plurality of pieces of video sub-data at the set second time intervals; and
   connecting the selected at least two pieces of video sub-data on the basis of time points to generate third video data, and
   the third video data includes video sub-data which is at least partially different from the first video data.

7. The method of claim 1, further comprising:
   processing the one or more pieces of video data as an input to a deep learning model to generate diagnostic information of a health condition and a pathological symptom,
   wherein the deep learning model includes one or more network functions and is trained with a training dataset including training input datasets and training output datasets,
   the training input datasets include a plurality of pieces of training video data generated on the basis of biosignals measured from each of a plurality of users in time series, and
   the training output datasets include a plurality of pieces of learning diagnosis information that each corresponds to the plurality of users.

8. The method of claim 7, wherein the deep learning model is generated when the one or more processors input each of the training input datasets to the one or more network functions, calculate errors by comparing each piece of output data computed through the one or more network functions with each of the training output datasets that each correspond to labels of the training input datasets, adjust weights of the one or more network functions in a back-propagation manner on the basis of the errors, determine whether to stop training the one or more network functions using verification data when the training is performed for a predetermined epoch or more, and test performance of the one or more network functions using a test dataset to determine whether to activate the one or more network functions.

9. A non-transitory computer-readable medium storing a computer program, wherein, when the computer program is executed by one or more processors, the computer program causes the one or more processors to perform operations of generating video data for diagnosing a health condition and a pathological symptom on the basis of a biosignal, the operations comprising:
   receiving a biosignal of a user;
   preprocessing the biosignal to generate a plurality of pieces of video sub-data; and
   selecting at least two of the plurality of pieces of video sub-data to generate one or more pieces of video data,
   wherein the biosignals are signals acquired in time-series from the user's body and includes one or more of an electroencephalography signal and an electrocardiogram signal acquired through one or more channels, and
   the receiving of the biosignals of the user comprises acquiring the biosignals through a plurality of electrodes on the basis of an electric potential difference measured from one or more areas of the user's body.

10. A computing device for generating video data for diagnosing a health condition and a pathological symptom on the basis of a biosignal, the device comprises:
   a processor configured to:
   receive biosignals of a user;
   preprocess the biosignals to generate a plurality of pieces of video sub-data; and
   select at least two of the plurality of pieces of video sub-data to generate one or more pieces of video data,
   wherein the biosignals are signals acquired in time-series from the user's body and includes one or more of an electroencephalography signal and an electrocardiogram signal acquired through one or more channels, and
   wherein the processor is further configured to acquire the biosignals through a plurality of electrodes on the basis of an electric potential difference measured from one or more areas of the user's body.

\* \* \* \* \*